(12) United States Patent
Bailey (10) Patent No.: US 7,726,138 B2
(45) Date of Patent: Jun. 1, 2010

(54) WATER PRODUCTION SYSTEM FOR MAKING POTABLE WATER

(75) Inventor: Richard J. Bailey, Kailua-Kona, HI (US)

(73) Assignee: Richard J. Bailey, Jr., Kailua-Kona, HI (US)

( * ) Notice: Subject to any disclaimer, the term of this patent is extended or adjusted under 35 U.S.C. 154(b) by 868 days.

(21) Appl. No.: 10/587,760

(22) PCT Filed: Jan. 31, 2005

(86) PCT No.: PCT/US2005/002645

§ 371 (c)(1),
(2), (4) Date: Jul. 28, 2006

(87) PCT Pub. No.: WO2005/075046

PCT Pub. Date: Aug. 18, 2005

(65) Prior Publication Data

US 2007/0151262 A1   Jul. 5, 2007

Related U.S. Application Data

(60) Provisional application No. 60/540,784, filed on Jan. 31, 2004.

(51) Int. Cl.
| | |
|---|---|
| F25D 17/06 | (2006.01) |
| F25D 21/14 | (2006.01) |
| F25D 23/00 | (2006.01) |
| F25B 21/02 | (2006.01) |
| F25B 41/00 | (2006.01) |
| F25B 25/00 | (2006.01) |
| F25B 23/00 | (2006.01) |
| F21D 21/00 | (2006.01) |
| F28C 1/00 | (2006.01) |
| B01D 9/04 | (2006.01) |

(52) U.S. Cl. .............................. 62/93; 62/3.2; 62/196.4; 62/332; 62/285; 62/291; 62/467; 62/272; 62/271; 62/123; 62/121

(58) Field of Classification Search .................. 62/285, 62/291, 93, 6, 121, 123, 271, 272, 467
See application file for complete search history.

(56) References Cited

U.S. PATENT DOCUMENTS

| 3,347,753 A | 10/1967 | Morse |
| 3,357,898 A | 12/1967 | Novakovich |

(Continued)

FOREIGN PATENT DOCUMENTS

| JP | 01015197 A | * | 7/1987 |

*Primary Examiner*—Thomas E Denion
*Assistant Examiner*—Michael Carton (57) ABSTRACT

A water production system (1) for making potable water (7) in an environment of humid tropical air (6) and cold deep ocean water (8) comprising a heat exchanger (2), means for controlling (3) the volume of the deep ocean water (2) passing through the heat exchanger (2) based on the amount of heat absorbed by the heat exchanger (2) in the process of condensing water vapor (7a) from the humid air (6), and means for enhancing (4) the rate of at which water vapor (7a) is condensed including a positive air pressure dome (9) system for enhancing the humidity, condensation rate, and water quality, and a continuous coil (2a) disposed in the flow of humid air (6) to condense additional potable water (7), and means for vibrating (38) elements of the system to increase condensation.

1 Claim, 5 Drawing Sheets

U.S. PATENT DOCUMENTS

| | | |
|---|---|---|
| 3,498,077 A | 3/1970 | Gerard et al. |
| 3,748,070 A * | 7/1973 | Heimerl .......................... 425/6 |
| 4,141,798 A | 2/1979 | Grosse |
| 4,253,795 A * | 3/1981 | McQueen .................. 415/125 |
| 4,292,136 A | 9/1981 | Clavier |
| 4,383,891 A | 5/1983 | Clavier |
| 4,741,123 A | 5/1988 | Gauthier |
| 4,956,936 A | 9/1990 | Sprung |
| 5,245,984 A * | 9/1993 | Longmore et al. .......... 126/639 |
| D363,993 S | 11/1995 | Johnson et al. |
| 5,517,829 A | 5/1996 | Michael |
| 5,553,459 A * | 9/1996 | Harrison ........................ 62/93 |
| 5,675,938 A * | 10/1997 | McLorg ....................... 52/2.26 |
| 6,220,039 B1 * | 4/2001 | Kensok et al. ................. 62/93 |
| 6,274,004 B1 | 8/2001 | Andersen |
| 6,440,275 B1 * | 8/2002 | Domen ....................... 202/234 |
| 6,574,979 B2 * | 6/2003 | Faqih .......................... 62/285 |
| 2002/0017108 A1 * | 2/2002 | Schooley ..................... 62/240 |

* cited by examiner

WATER PRODUCTION SYSTEM FOR MAKING POTABLE WATER

Applicant claims priority to U.S. Provisional Application for an An Improved Condensation System, Application No. 60/540,784, filed 31 Jan. 2004, which is incorporated herein by reference.

BACKGROUND OF THE INVENTION

This invention relates to a water production system for making potable water in an environment of humid tropical air and a cooling fluid, preferably cold deep ocean water. The water production system comprises a heat exchanger, means for controlling the volume of the cooling fluid passing through the heat exchanger, and means for enhancing the rate of at which water vapor is condensed including selectively a positive air pressure dome system for enhancing the humidity, condensation rate, and water quality, and a continuous coil disposed in the flow of humid air to condense additional potable water, and means for vibrating elements of the system to increase condensation.

The improvements of this important invention comprise enhancing the humidity of the humid air, condensation rate, and water quality of the condensation system, which may include a positive air pressure dome system having a sheeting cover supported by the positive air pressure. The positive air pressure can be supplied by at least one air fan. The sheeting cover is preferably free of contact with the heat exchanger contained therein, and the sheeting cover may be secured to the ground at its peripheral edge. The positive pressure within the dome system can enhance the condensation rate and air borne water contaminants can be reduced. Utilizing the sheeting system allows flexibility for expansion of and the ability to cover a number of additional heat exchangers which can be disposed laterally at the same elevation and still be kept under an extended dome system.

Preferably, the at least one air fan includes a ducted air fan humidifier, in which the humidity levels within the dome system can be further enhanced to increase the condensation rate. The means for governing may further comprise at least one continuous coil looped over a coil support structure that is disposed in the flow of humid air to condense additional potable water from the humid air. The at least one continuous coil is supplied with cooling fluid entering or discharging from the heat exchanger. The at least one continuous coil may be loosely looped over a coil support structure. Additionally, the means for governing may comprise means for vibrating the at least one continuous coil and more generally means for vibrating the tubes of the heat exchanger.

This improved condensation system may further comprise means for controlling the cold water transported through the heat exchanger based on at least one of the temperature of the cooling water discharging from the heat exchanger, the temperature of the water in or discharging from a reservoir that collects the water discharging from the heat exchanger, and the differential between the temperature of the water entering the heat exchanger and the temperature of the water leaving the heat exchanger. Specifically, the means for controlling the cold water transported through the heat exchanger may comprise an inlet reservoir for receiving cold water, an outlet reservoir for receiving the cold water discharged from the heat exchanger, and each of the inlet reservoir and the outlet reservoir containing a volume of cooling water having an inlet upper level and an outlet upper level, respectively.

The inlet upper level may be maintained by at least one float valve which controls the volume of cold water entering the inlet reservoir; the outlet upper level is controlled by at least one moveable weir, and a cold water circuit may extends from the inlet reservoir through the heat exchanger to the outlet reservoir. Preferably, each of the inlet reservoir and the outlet reservoir is un-pressurized. The inlet end of the cold water circuit is disposed below the inlet upper level, and the outlet end of the cold water circuit is disposed below the outlet upper level. Means for measuring the temperature of the cooling water near the outlet end of the water circuit and producing a signal to control movement of the at least one moveable weir in response to the temperature is required. Additionally, the means for measuring may include measuring the temperature of the cooling water near the inlet end of the water circuit for determining the differential temperature. It is preferred that the controlled flow of cold water be siphoned through the water circuit by a vacuum created when the at least one moveable weir is lowered bringing down the outlet upper level in the outlet reservoir in response to the temperature measurement.

Unlike the present invention, U.S. Pat. No. 5,675,938 issued in 1997 to McLorg for a desert envitalization system with variable volume pneumatic polydome enclosure discloses an inflatable enclosure for condensing and collecting water vapor from solar heated seawater. The pneumatic enclosure is maintained at a positive pressure by an inflation fan. The '938 patent collects condensate that is plumbed to a ballast system which helps hold up the dome during the nighttime; it does not produce condensate for drinking water, nor does it protect a fluid heat exchanger. It is a closed hydrological system whereas the instant invention is open but internally pressurized.

Moreover, U.S. Pat. No. 6,440,275 issued in 2002 to Domen for solar stills for producing fresh water uses an inflatable bladder system. Domen's solar still does not use a heat exchanger employing cold water and has a closed environment whereas the instant invention is a positive pressure but open environment system.

Furthermore, U.S. Pat. No. 4,956,936 issued to Sprung in 1990 for a method and system for purification of water for greenhouse structures teaches a device and method for the generation and subsequent condensation and collection of water vapor within the volume of a greenhouse. The '936 patent teaches only water production for irrigation to plants in a closed environment system and the water produced is not collected from an internal heat exchanger. Also see U.S. Pat. No. 4,741,123 issued to Gauthier in 1988 for a greenhouse equipped with a watering system which captures and distributes condensate water from the morning and evening dews. The '123 patent is used for watering plants only and not for potable, commercial, or industrial water production. Additionally, it is not related to the use of a heat exchanger system.

U.S. Pat. No. 3,498,077 issued in 1970 to Gerard et al. for an atmospheric water recovery method and means for obtaining potable water from atmospheric air, in which cold deep seawater is pumped through a heat exchanger that reacts with humid air to produce condensate potable water that is collected in a tank. The '077 patent does not use a moderated environment to condense water vapor and it does not teach the use of a dome system to control aerial contamination of the freshwater produced, nor does it control the flow of deep sea water based on temperature.

Design Patent D363,993 issued in 1995 to Johnson et al. for an inflatable shelter does not teach a dome system used for the production of freshwater nor does it indicate a pressurized air-flow system for inflation. Other background patents have been included in the provisional application referenced above.

The citation of the foregoing publications is not an admission that any particular publication constitutes prior art, or that any publication alone or in conjunction with others, renders unpatentable any pending claim of the present application. None of the cited publications is believed to detract from the patentability of the claimed invention.

ADVANTAGES OF THIS INVENTION

To alleviate problems of inefficiency and enhance the utilization of deep ocean water in the production of drinkable water, and other advantages which will become apparent from the disclosure which follows, the present invention conveniently regulates the temperature and flow rate of the heat exchanging fluid evenly to multiple parallel heat exchangers by using a variable height two-reservoir system which allows for linear expansion of adjacent, preferably parallel, heat exchangers, no plumbing fittings are required for each additional heat exchanger as it can be used with common reservoirs, and the system allows for common flow rate regulation based on cooling fluid temperature for each heat exchanger which can be measured simultaneously.

Condensing rates increase under positive air pressure conditions and more freshwater is produced. The positive air structure dome design can be expanded linearly easily to cover more than one heat exchanger; the dome design is a building code approved structure. The dome serves at the same time to control air quality to meet health standards for water source certification.

The cooling fluid passing through the heat exchanger is siphoned with negative pressure. Should a leak occur in the heat exchanger, air will be taken into the cooling fluid, rather than cooling fluid leaking out into the condensed potable water. Moreover, if a number of parallel heat exchangers are employed, a leak in one will not affect the operation of the other heat exchangers.

These together with other objects of the invention, along with the various features of novelty which characterize the invention are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

Still other advantages will be apparent from the disclosure that follows.

SUMMARY OF THE INVENTION

The invention relates to a water production system for efficiently making potable water in an environment of humid air comprising at least one heat exchanger, means for controlling the volume of the cooling fluid passing through the at least one heat exchanger, and means for enhancing the rate of at which water vapor is condensed from the humid air. The cooling fluid is drawn internally through the heat exchanger by a negative pressure differential. The heat exchanger is disposed in a path of the humid air so that the humid air flows externally on the heat exchanger to condense water vapor from the humid air and produce potable water. The means for controlling is responsive to temperature measurements that reflect cycle efficiency and the amount of heat absorbed by the heat exchanger in the process of condensing water vapor from the humid air. Various means for enhancing the rate of at which water vapor is condensed from the humid air are further taught by this useful invention.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWING

Preferred embodiments of the invention are described hereinafter with reference to the accompanying drawing wherein:

FIG. 1 is a side elevation schematic representation of the water production system of the present invention showing deep ocean water being pumped into an inlet reservoir with the flow being controlled by a reservoir float valve, said reservoir being used to supply cooling water to a heat exchanger that is disposed in the path of humid air to condense potable water from the humid air which is then collected and transported to for treatment or storage, wherein the cooling fluid discharges into an outlet reservoir after passing through the heat exchanger with some of the cooling fluid first passing through a cooling coil and all of the cooling fluid eventually discharging into the outlet reservoir with a siphoning connection existing between the inlet reservoir and the outlet reservoir through the heat exchanger path such that when the level of the outlet reservoir is reduced, the flow of cooling water through the heat exchanger is increased and the discharge from the outlet reservoir is used to move a waterwheel which in turn powers a condensate pump, and with the fluid powering the water wheel being returned to the ocean.

DETAILED DESCRIPTION OF THE INVENTION

Without departing from the generality of the invention disclosed herein and without limiting the scope of the invention, the discussion that follows, will refer to the invention as depicted in the drawing.

The preferred embodiments of the apparatus depicted in the drawing comprise a water production system 1 for efficiently making potable water in an environment of humid air comprising at least one heat exchanger 2, means for controlling 3 the volume of the cooling fluid passing through the at least one heat exchanger, and means for enhancing 4 the rate of at which water vapor is condensed from the humid air. A cooling fluid 5 is drawn internally through the heat exchanger 2 by a negative pressure differential. The heat exchanger is disposed in a path of the humid air 6 so that the humid air flows externally on the heat exchanger to condense water vapor 7a from the humid air and produce potable water 7. The means for controlling 3 is responsive to the amount of heat absorbed by the heat exchanger 2 in the process of condensing water vapor 7a from the humid air 6. Various means for enhancing the rate of at which water vapor is condensed from the humid air are further taught by this useful invention. The heat exchanger 2 may comprise at least one continuous coil 2a.

A 12" HDPE main trunk pipeline 12 can be used to supply Deep Ocean Water (DOW) 8 to the system. Preferably, the DOW enters a dome 9 where it is pumped to at least one of a series of 6 inch diameter float valves 10 connected to the inlet reservoir 14. The DOW level in the inlet reservoir 14 is maintained preferably at a height just short of the inlet reservoir top overflow at 4.5 feet above elevation grade. As the water reaches the set water level in the inlet reservoir 14, the float valve 10 closes stopping the incoming cooling fluid 5 flow. The inlet reservoir may have two parallel channels that can act to remove air bubbles before entering the heat exchanger to avoid causing air-locks and stopping water flow under siphon conditions.

At the other end of the heat exchanger 2 is an outlet reservoir 16 that runs parallel to the inlet reservoir 14. The DOW water level in the inlet reservoir 14 is set also at 4.5' above grade through an equalizer pipe (or valved u-tube) 18 that connects the two reservoirs near the bottom of the reservoirs.

The outlet reservoir water level will be regulated by at least one weir 20 once the equalizer pipe valve 22 is set to the closed position.

The heat exchanger 2 may consist of at least one 20'×4" wide 1.5" diameter Sea-Cure™ Stainless Steel (PREN=42) serrated helical finned tubes (tubing diameter will be determined after research tests). Each tube will be an inverted "U-tube" preferably has a 90° bend at each end with a 3.5' nipple that will hang vertically into both the DOW inlet reservoir 14 and outlet reservoir 16. The heat exchangers 2 will preferably be approximately 3 inches above the top of each reservoir wall. The heat exchangers are installed when the reservoirs are at full level. When installed they will be individually evacuated of air to fill each tube heat exchanger with DOW.

The heat exchangers 2 can be supported in the middle by a suspension brace connected to a series of fiberglass/PVC I beam trusses. The trusses also serve to suspend HDPE sheeting linearly above the heat exchanger 2 that acts a hood to direct the humid air 6 from atop of the dome 9 structure down to the heat exchangers 2. A draw draft is also created from the cold heavy air created at the heat exchangers. The air is directed down to the cold air exhaust ducts 24 and then vented out of the dome 9 structure.

Figures 1, 2, 3:
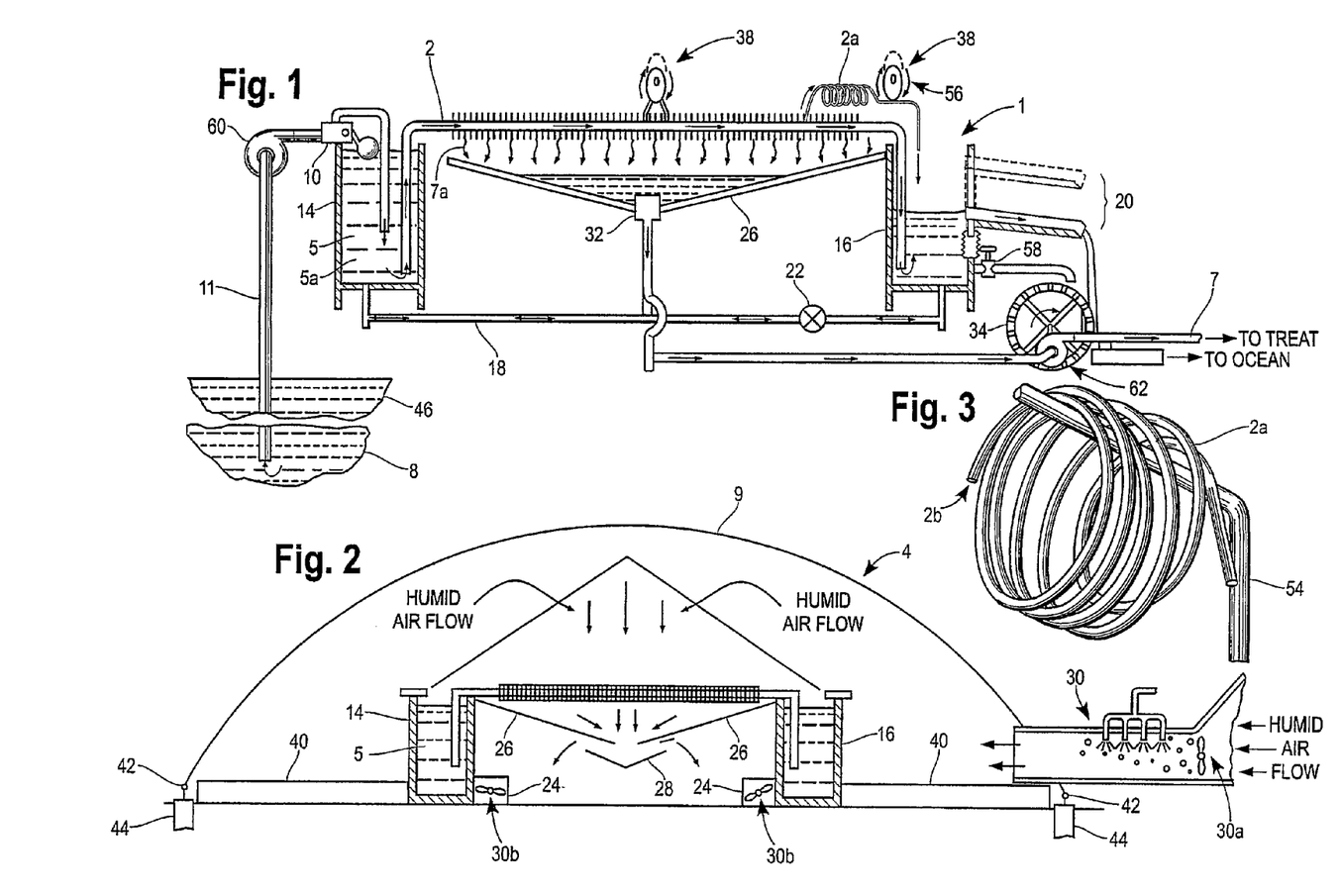
FIG. 2 is a side elevation schematic view of the water production system showing the heat exchanger and reservoirs under a dome which is occupied by pressurized humid air supplied to the domed system by a fan or ducted air humidifier for enhancing the humidity of the air passing over the heat exchanger, and open sea water reservoirs are also provided under the dome to enhance humidity.
FIG. 3 shows a support structure showing a loosely coiled tubing which is used in addition to the finned tubes of the heat exchanger for producing condensation.
Figure 4:
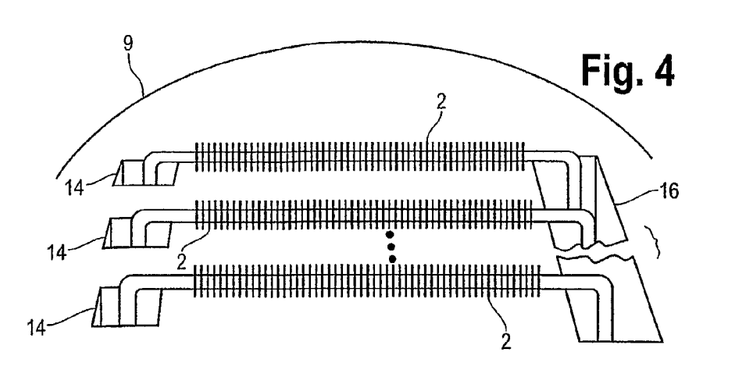
FIG. 4 is a schematic representation of a plurality of parallel heat exchangers showing a plurality of inlet reservoirs and a single common outlet reservoir adapted for the plurality of heat exchangers.
Figure 5:
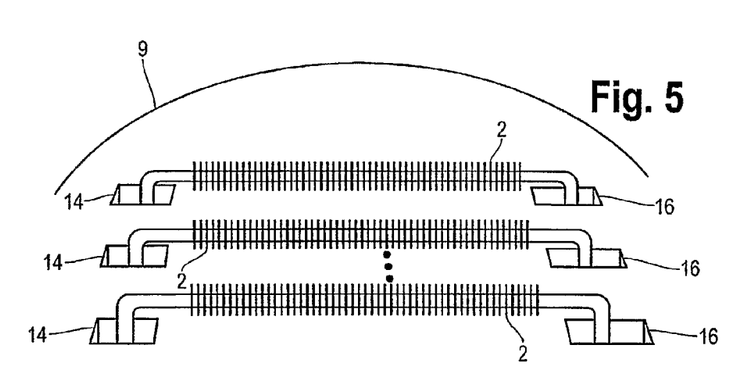
FIG. 5 is a schematic representation of a plurality of parallel heat exchangers, each with its own inlet and outlet reservoirs.

Initializing the DOW flow though the heat exchangers 2 is done by reducing the water level in the outgoing DOW reservoir, as shown in FIG. 1, which creates a vacuum on the heat exchanger circuit which starts DOW flowing through heat exchangers 2. For multiple heat exchangers, all can be regulated at an even rate towards the outlet reservoir(s) 16, as shown in FIGS. 1, 4 and 5. Water flow rate can be used to regulate an optimum DOW temperature 55-58° F. (ten degrees below dew point temperature). The flow rate thus can be regulated to exactly the amount of DOW 8 needed to produce condensate. Once the DOW starts flowing through the heat exchangers 2 they will begin to drip freshwater.

Data collected from tests in natural outside relative humidly (60% RH) conditions has shown that 80% of the fins on each tube will produce one drop of freshwater every minute. The heat exchangers have 40 fins per foot or 800 fins per 20' heat exchanger tubing length. The tubes independent of each other and can be serviced and cleaned easily. If a tube does fail and develops a pin hole leak, since it is under vacuum pressure it will suck in air and go dry and not produce freshwater, an indication of a problem. Sea water (DOW) 8 cannot contaminate the freshwater due to a failed heat exchanger.

Under the DOW heat exchangers lies a plate of HDPE sheeting which serves as a drip pan collector 26. As best shown in FIG. 2, the linear sheeting is sloped down towards the center and has a open linear gap of two feet. Below this gap lies another V shaped drip collector pan 28 approximately one foot under it. The gap between the top and bottom drip pan collectors allows the cold dry air created when the moisture has been stripped from the humid air [as it passed by the cold DOW heat exchanger tubes as it] to fall because of its cooler temperature and the positive air flow pressure generated by the incoming air from the ducted fan humidifiers 30. The air-flow is directed to an exhaust air duct 24 system located at the base under the freshwater collection pans along the axis of the dome 9. The exhaust air ducts 24 also regulates inside air pressure to maintain the dome inflation.

Figure 6:
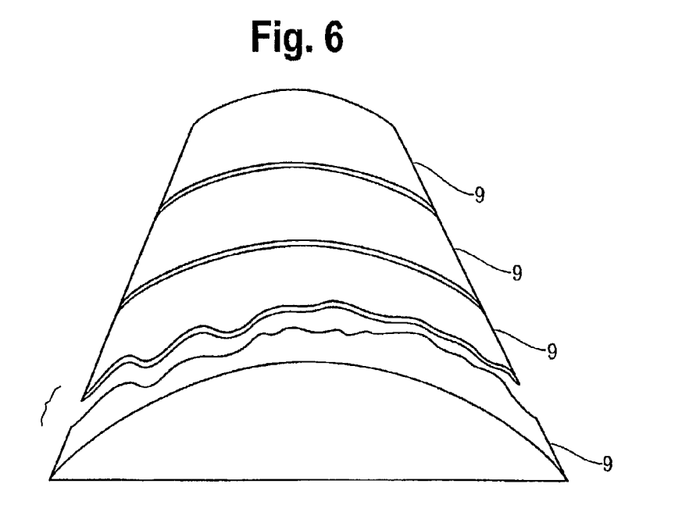
FIG. 6 is a schematic representation of the dome used to cover the heat exchanger systems showing how it can be extended laterally to cover a plurality of heat exchangers.

For multiple heat exchanger systems, such as those illustrated in FIGS. 4-6, the freshwater can be collected at the middle of the 300' drip pan reservoir 32 (shown in FIG. 1) that slopes to center of the dome from two ends. The freshwater will be plumbed to health approved (6) 5000 gallon holding tanks from which they will be plumbed to filtration system (if needed and to be determined scope based on first DOH water certification analysis) and then to the bottling plant. Solar pumps and/or water driven wheels 34 can be used to raise the water into elevated storage tanks 36 equipped with DOW cooling coils to maintain water freshness.

One of the objects of the water production system of this important invention is increased efficiency of water production. By increasing ambient pressure greater water production is effected. Enhancing the specific humidity of the humid air with ducted humidifier 30 fans and a controlled environment increase the condensation rate. Moreover, vibratory means 38 are taught which increase condensation by releasing condensed water droplets from the heat exchanger surfaces. Additionally, optimum efficiency is achieved by matching the rate of cooling fluid 5 to the energy consumed in the condensation process. See FIGS. 9A-C.

Alternative elements and processes can be combined as the means for enhancing the rate of at which water vapor is condensed from the humid air including means for enhancing the specific humidity of the humid air. For example, the means for increasing the ambient pressure of the humid air in the path that flows externally on the at least one heat exchanger may include increased ambient pressure of the humid air with the use of fans and a partially open structure, i.e. a dome 9 system, which further serves to control humidity and air direction over the heat exchanger 2. Additionally, open sea water reservoirs 40 may also be provided under the dome 9 to enhance humidity. Sea water reservoirs 40 are available commercially through SolAqua at www.solaqua.com.

The partially open structure (i.e. the dome) 9 can be disposed above the at least one heat exchanger 2 and at least one fan 30a for creating a positive air pressure of the humid air 6 in the partially open structure. The partially open structure preferably comprises a flexible dome 9 system having a sheeting cover supported bulgingly by the positive air pressure and means for anchoring 42 the sheeting cover, so that the positive air pressure within the dome system can be enhanced to increase the condensation rate and air borne water contaminants can be reduced within the dome 9 system. As shown in FIG. 2, the flexible dome 9 system may be independent of contact with the at least one heat exchanger 2.

In operation a positive pneumatic membrane dome structure will house the fluid to air heat exchanger tube heat exchangers. Air pressure in excess of 1" of water column should maintain the inflated membrane. Air will enter and exit the dome 9 structure and the flow rate will be regulated to maintain the positive pressure environment. Atmospheric moisture entering the dome structure will be removed by condensation on the heat exchanger tubes.

The dome 9 can be made of 5 year PVC nylon reinforced sheeting material that will be inflated and supported upward in a linear arc, as best illustrated in FIG. 6, by positive air pressure of approximately 0.036 psi (1" water column). Air pressure can be supplied by ten 0.5 hp incoming ducted air fan humidifiers 30 at a rate of 30-50000 cfm. The dome structure is preferably not connected to any of the internal production system components except at its' perimeter base. The dome 9 serves to create an envelope wherein the environmental humidly levels can be maximized for increased condensation and extraction, while at the same time controlling air quality to meet health standards for water source certification. The dome will be anchored to the ground with a concrete perimeter 44 to resist the combined lift of inflation pressure and wind drag. Access to the dome structure will be through building code approved exit doors that conform to local building codes for commercial facilities. The doors will located in the middle of the dome and will be a double door air-lock design.

A commercially available building code approved positive pneumatic dome structure will house the DOW (Deep Ocean Water) 8 heat exchangers 2 (i.e., marine grade stainless steel helical serrated finned tube heat exchangers). The dome 9 will be preferably 60' wide by 15' tall by 300' long (0.41 acres). The positive pneumatic dome structure will meet industry standards including Air Structures Design and Standards Manual ASI, ASCE, CSA, CAN-S109, NFPA 701, UBC, and BOCA engineering requirements. The dome structure will be able to withstand winds in excess of 70 mph at a minimum inflation pressure of 1 inch water pressure. At higher inside air pressures winds the structure should withstand winds in excess of 100 mph.

Figures 11, 12:
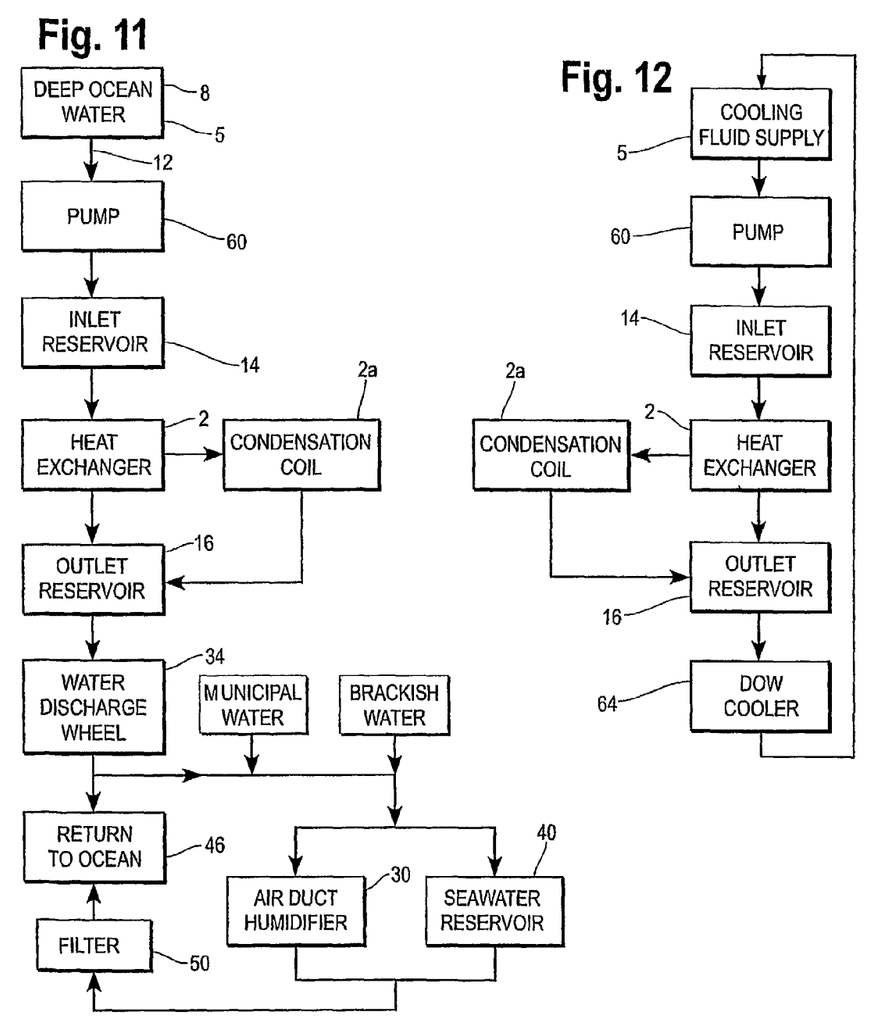
FIG. 11 is a flow diagram of the deep ocean water used in the water production system to condense potable water from the humid air.
FIG. 12 is a flow diagram for cooling fluid used in the water production system to condense potable water from the humid air.

Preferably, the at least one fan 30a comprises a ducted fan humidifier 30 in which a fan is configured at an end of an air duct open to outside atmosphere. These fans blow outside air inward through the duct inflate the dome structure. The ducted air humidifier 30 can be provided with a number of suitable water sources, including brackish water, shallow (warmer) ocean water 46, cooling fluid discharge, or municipal water, as shown in FIG. 11. Since the water directed to the ducted air humidifier is preferably warm or hot, surface ocean water would be preferable to colder deep ocean water. The water production system may further include a duct equipped with a water sprinkler or mister or water dripper. The water mister/sprayer/dripper feeds water into a fanned air duct to increase the incoming air to near humidity saturation, as shown in FIG. 2. The number of fans 30a and ducted fan humidifiers 30 will be determined by the size of the fans, the size of the dome 9, and the pressure needed to maintain the dome structure and optimize condensation within such environment. So the fans serve two important roles in adding moisture to and increasing the pressure of the humid air entering the partially open structure. In this way, the humidity levels within the partially open structure can be enhanced to increase the condensation rate.

The at least one fan 30a of the water production system may further comprise at least one air discharge fan for removing air that has flowed externally on the at least one heat exchanger 2 and for balancing the positive air pressure in the partially open structure.

The water production system may further include a treatment system 48 for the potable water 7. The treatment system may comprise at least one of a filter 50 and a chemical treatment system 52. It is contemplated that the system will have its own storage 36 vessels for temporary storage prior to bottling.

A preferred embodiment of the means for enhancing the rate of at which water vapor is condensed from the humid air comprises means for vibrating 38 the heat exchanger 2 to break the surface tension of and release the condensed water on an external surface of the at least one heat exchanger. The vibration device, which may be electrically or hydraulically driven, cyclically vibrates the tubes of the heat exchanger to reduce condensate buildup, allowing the condensate to be stripped off the heat exchanger tubes more quickly and allows for further condensation to occur.

As currently contemplated, the middle heat exchanger support also will be equipped with at vibration device that reduces water surface tension and allows for water to sheet off more quickly. This allows for more water to form on the heat exchanger, increasing condensing rate. The heat exchangers will also be equipped with a water driven vibration device which will be apart of the truss framework suspended over the heat exchangers 2. The heat exchanger tubing can be vibrated once per minute to break water tension and increase water production rate. A similar vibrator can be used with the continuous coil 2a to increase its condensation rate.

Furthermore, the means for enhancing the rate of at which water vapor is condensed from the humid air of the water production system of the present invention may comprise at least one continuous coil 2a that is disposed in the flow of humid air to condense additional potable water from the humid air, as shown in FIG. 1. Each of the at least one continuous coil may have an internal passageway 2b extending throughout the length of the coil in which a coolant flows from one end of the coil to the other, as shown in FIG. 3. The coolant is one of the cooling fluid prior to entering the heat exchanger and the cooling fluid discharging from the heat exchanger, and it is preferably drawn through the at least one continuous coil by a negative pressure differential. In a preferred embodiment, each of the at least one continuous coil is loosely looped over a coil support structure 54.

The rate of condensation of each of the at least one continuous coil may be enhanced by means for periodically moving 56 at least one of the at least one continuous coil 2a to break the surface tension of and release the condensed water on an external surface of the at least one continuous coil. The frequency of such movement may be varied.

Figure 9A:
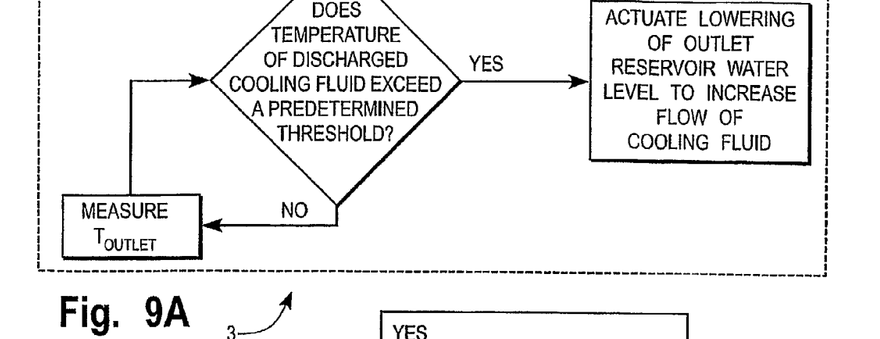
FIG. 9a is a block diagram showing a controller for regulating the flow of cooling fluid through the heat exchangers based on the temperature of the cooling fluid of the outlet reservoir.

The means for controlling 3 the volume of the cooling fluid 5 passing through the at least one heat exchanger 2 may be responsive to the temperature of the cooling fluid discharging from the heat exchanger, as shown in FIG. 9A. Moreover, it may be responsive to the differential temperature between the cooling fluid entering and leaving the heat exchanger, as shown in FIG. 9B.

The means for controlling 3 the volume of the cooling fluid passing through the at least one heat exchanger 2 may comprise at least one inlet reservoir 14 open to the environment for receiving the cooling fluid 5 and at least one outlet reservoir 16 open to the environment for receiving the cooling fluid discharged from the heat exchanger 2. The at least one inlet reservoir 14 comprises at least one float valve 10 for maintaining a volume of cooling water in the inlet reservoir 14 at a predetermined inlet upper level. The at least one outlet reservoir 16 is open to the environment for receiving the cooling fluid 5 discharged from the heat exchanger 2. The at least one outlet reservoir 16 comprises a controller (e.g. means for controlling 3) for controlling an outlet upper level that is below the inlet upper level. The at least one heat exchanger 2 has a cooling fluid circuit extending from the inlet reservoir 14 through the heat exchanger 2 to the outlet reservoir 16. Referring to FIG. 1, said inlet end of the cooling fluid circuit is disposed below the inlet upper level and the outlet end of the cooling fluid circuit is disposed below the outlet upper level, so that a regulated flow of cooling fluid is siphoned through the cooling fluid circuit by a vacuum created when the controller lowers the outlet upper level in the outlet reservoir 16 in response to the temperature of the cooling fluid 5 at the outlet end of the water circuit.

Preferably, a portion of the cooling fluid circuit extending between the inlet end and the outlet end is disposed slightly higher in elevation than the inlet upper level of the inlet reservoir. Moreover, it is preferred that the portion of the cooling fluid circuit extending between the inlet end and the outlet end is disposed slightly higher in elevation than an upper rim of both the at least one inlet reservoir 14 and the at least one outlet reservoir 16.

Figure 9B:
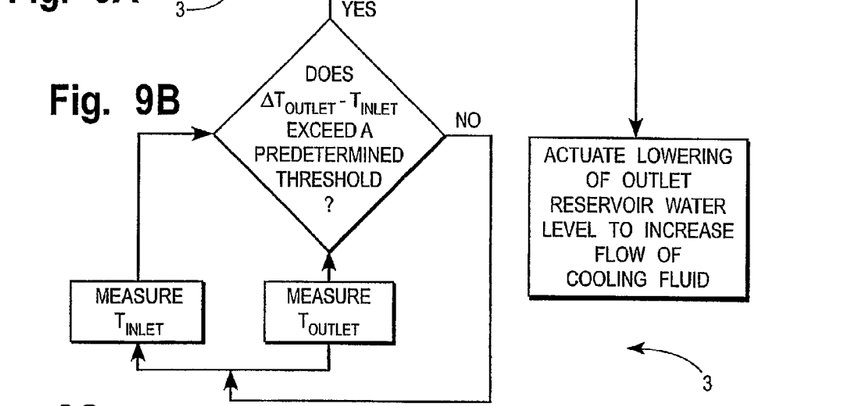
FIG. 9b is a second embodiment of a block diagram showing the controller for regulating the flow of cooling fluid through the heat exchangers based on the change in temperature of the cooling fluid across the heat exchanger.

Additionally, the controller may comprise a thermostat that is responsive to at least one of the temperature of the cooling fluid in the outlet reservoir and independent of the temperature of the cooling fluid in the inlet reservoir (see FIG. 9A), the temperature of the cooling fluid being released from the outlet reservoir (see FIG. 9A), and the difference in the temperature of the cooling fluid in the inlet reservoir and the temperature of the cooling fluid in the outlet reservoir (see FIG. 9B).

Furthermore, the controller may comprise a moveable weir 20 operably connected to a thermostat that is responsive to the temperature of the cooling fluid in the outlet reservoir 16. Another preferred embodiment of the controller comprises an actuated valve 58, for regulating the release of cooling fluid 5 from the outlet reservoir 16 and adjusting the outlet upper level, operably connected to a thermostat that is responsive to the temperature of the cooling fluid in the outlet reservoir 16.

Preferably, the cooling fluid 5 of the water production system 1 of the instant invention comprises deep ocean water 8.

Figure 7:
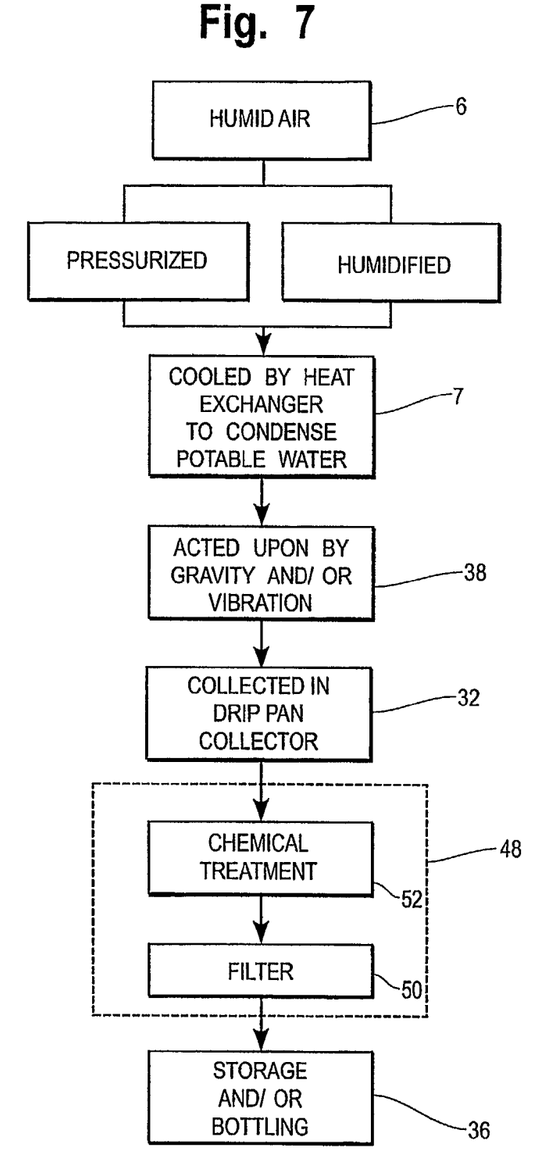
FIG. 7 is a flow diagram showing the path of moisture in the humid air being processed to produce potable water.
Figure 8:
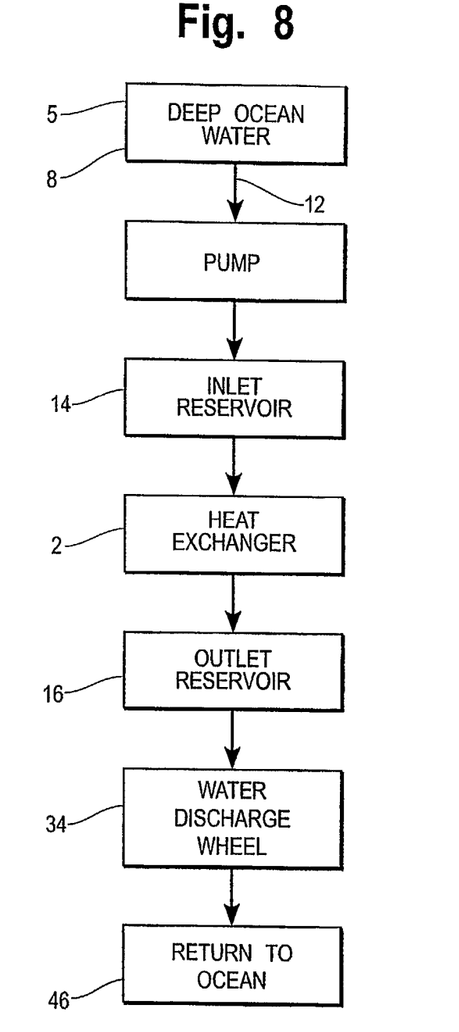
FIG. 8 is a flow diagram showing the path of the deep ocean cooling water.

Furthermore, each of the at least one heat exchanger 2 of the water production system 1 of the present invention may comprise a heat exchanger support structure to support the at least one heat exchanger at a predetermined height above grade. A variety of generic framing structures adapted for the location and number of heat exchangers can be employed by those skilled in the support structure art. The heat exchanger support structure preferably has a drip collector 26 for collecting potable water 7. A water wheel 34 may be disposed in the path of the cooling water 5a that discharges from one of the at least one heat exchanger 2 and the outlet reservoir 16 for transporting the potable water 7 from the drip collector 26 into a storage tank 36, as shown in FIGS. 1 and 7.

Figure 9C:
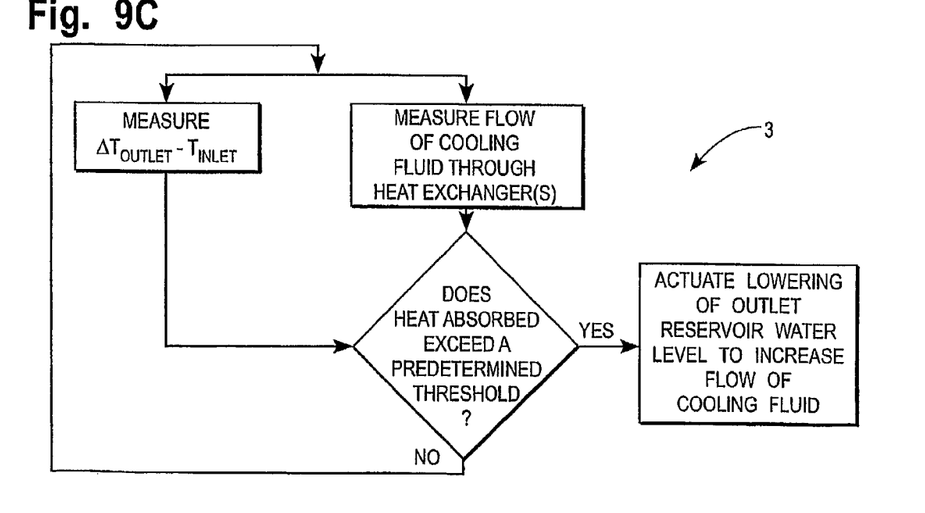
FIG. 9c is third embodiment of a block diagram showing the controller for regulating the flow of cooling fluid through the heat exchangers based on the heat absorbed by the heat exchanger.
Figure 10:
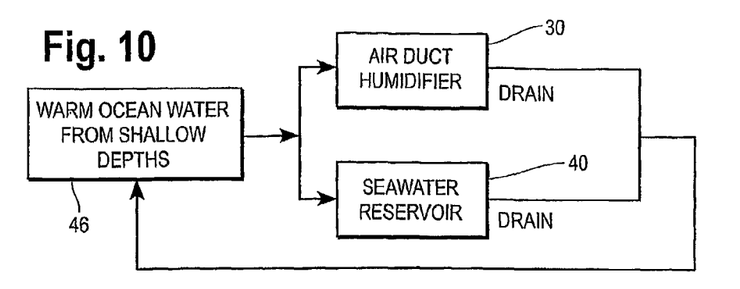
FIG. 10 is a flow diagram of a preferred embodiment utilizing warm ocean water from shallow depths to supply water to the ducted air humidifier and the sea water reservoir.

In detail, the water production system 1 for efficiently making potable water in an environment of humid air may comprise at least one heat exchanger 2 in which a cooling fluid 5 is drawn through internally by a negative pressure differential, means for controlling 3 the volume of the cooling fluid passing through the at least one heat exchanger 2 in response to an amount of heat absorbed by the at least one heat exchanger in the process of condensing water vapor from the humid air, as shown in FIG. 9C, and means for enhancing 4 the rate of at which water vapor is condensed from the humid air 6 by the specific humidity when the ambient pressure of the humid air in the path that flows externally on the at least one heat exchanger 2 including at least one fan 30a for creating a positive air pressure of the humid air is increased. The at least one heat exchanger 2 is disposed in a path of the humid air 6 so that the humid air flows externally on the at least one heat exchanger 2 to condense water vapor 7a from the humid air 6 and produce potable water 7. In this way, the positive air pressure can be enhanced to increase the condensation rate.

By preference, the means for enhancing 4 includes a partially open structure disposed above the at least one heat exchanger. The partially open structure comprises a flexible dome 9 system having a sheeting cover supported bulgingly by the positive air pressure and means for anchoring 42 the sheeting cover, and the at least one fan 30a creates the positive air pressure of the humid air 6 in the partially open structure, so that the positive air pressure within the dome 9 system can be enhanced to increase the condensation rate and air borne water contaminants can be reduced within the dome system. The flexible dome 9 system may be independent of contact with the at least one heat exchanger 2.

Furthermore, the at least one fan 30a may comprise a ducted fan humidifier 30 for adding moisture to and increasing the pressure of the humid air 6 entering the dome 9 system, so that the humidity levels within the dome system can be enhanced to increase the condensation rate. By preference, the at least one fan 30*a* further comprises at least one air discharge fan 30*b* for removing air that has flowed externally on the at least one heat exchanger 2 and for balancing the positive air pressure in the partially open structure.

In a preferred embodiment of the water production system 1 for efficiently making potable water 7 in an environment of humid air 6, a plurality of heat exchangers 2 in which a cooling fluid 5 is drawn through internally by a negative pressure differential, means for controlling 3 the volume of the cooling fluid 5 passing through the plurality of heat exchangers 2 in response to an amount of heat absorbed by the plurality of heat exchangers in the process of condensing water vapor from the humid air, as shown in FIG. 9C, and means for enhancing 4 the rate of at which water vapor 7*a* is condensed from the humid air 6 are provided. Each of the plurality of heat exchangers is disposed in a path of the humid air so that the humid air flows externally on the heat exchanger to condense water vapor from the humid air and produce potable water.

More suitably, each of the plurality of heat exchangers 2 is elongated, disposed in a parallel relationship to one another, as shown in FIGS. 4 and 5, where the plurality of heat exchangers are disposed laterally, and the means for controlling 3 the volume of the cooling fluid 5 passing through the plurality of heat exchangers interconnects the cooling fluid discharged from each of the plurality of heat exchangers, as shown in FIG. 4.

Another desirable version of the water production system 1 for efficiently making potable water 7 in an environment of humid air 6 comprises at least one heat exchanger 2 in which a cooling fluid 5 flows through internally, means for controlling 3 the volume of the cooling fluid passing through the at least one heat exchanger in response to an amount of heat absorbed by the at least one heat exchanger in the process of condensing water vapor from the humid air, and means for enhancing 4 the rate of at which water vapor is condensed from the humid air including increasing the ambient pressure of the humid air in the path that flows externally on the at least one heat exchanger with a partially open structure (i.e. the dome) 9 disposed above the at least one heat exchanger 2 and at least one fan 30*a* for creating a positive air pressure of the humid air in the partially open structure. The at least one heat exchanger being disposed in a path of the humid air so that the humid air flows externally on the at least one heat exchanger to condense water vapor from the humid air and produce potable water.

Additionally, the at least one fan 30*a* comprises a ducted fan humidifier 30 for adding moisture to and increasing the pressure of the humid air 6 entering the dome 9 system, so that the humidity levels within the dome system can be enhanced to increase the condensation rate.

Furthermore, the means for enhancing 4 the rate of at which water vapor 7*a* is condensed from the humid air 6 further may comprise means for vibrating 38 the heat exchanger 2 to break the surface tension of and release the condensed water on an external surface of the at least one heat exchanger.

The means for enhancing 4 the rate of at which water vapor is condensed from the humid air 6 may also include at least one continuous coil 2*a* that is disposed in the flow of humid air 6 to condense additional potable water 7 from the humid air 6, each of the at least one continuous coil having an internal passageway 2*b* extending throughout the length of the coil in which a coolant flows from one end of the coil to the other. Where the coolant is one of the cooling fluid 5 before entering the heat exchanger 2 and the cooling fluid discharging from the heat exchanger. The means for enhancing 4 the rate of at which water vapor is condensed from the humid air may further comprise means for periodically moving 56 at least one of the at least one continuous coil 2*a* to break the surface tension of and release the condensed water on an external surface of the at least one continuous coil. Also, the means for enhancing 4 the rate of at which water vapor is condensed from the humid air further may comprise means for controlling 4 the volume of the cooling fluid passing through the at least one heat exchanger in response to the temperature of the cooling fluid discharging from the heat exchanger.

In start up operation the cooling fluid 5, preferably less than 50° F., (or 10° C. below dew point temperature), enters the inlet reservoir 14 at a float valve 10 regulator. An equalizer valve 22 is opened to allow the heat exchanging fluid (i.e. cooling fluid 5) to equalize in depth in the outlet reservoir 16. Once the reservoirs reach maximum level, the float valve 10 will stop incoming fluid. At this point the equalizer valve 22 is closed. Once the reservoirs (14 and 16) are full to equal fluid level, the heat exchanging tubes can be evacuated of air and filled with the heat exchanging fluid linking the reservoirs by a siphon bridge.

When the means for releasing water (i.e. the weir or actuated valve) from the outlet reservoir 16 is actuated, the water level of the outlet reservoir lowers and discharges onto the water wheel 34. Water in the inlet reservoir 14 will begin to migrate through the heat exchanger tubes to the outlet reservoir 16 via a siphon. The means for releasing water from the outlet reservoir which may consist of a moveable weir regulates the heat exchanger fluid flow rate through the heat exchanger tubes. The flow rate also regulates the cooling fluid absorption of heat. After the heat exchanging fluid flow has stabilized, fine adjustments in the weir level can be made to tune the desired temperature differential between inlet reservoir 14 and the outlet reservoir 16.

As the heat exchanging fluid passes through the heat exchanger tubing, freshwater condensate forms on the outside of the tubing which is collected as it falls in to a condensation collection pan where it is plumbed to a water pump 62 or gravity drained into a storage tank 36 or to a bottling apparatus.

The heat exchanging fluid (i.e. cooling fluid 5) exiting the outlet reservoir 16 converts potential energy to kinetic energy to power an overshoot waterwheel 34 that provides drive power to system including the condensate water pump 62. The exiting heat exchanger fluid, when a refrigerant is used, could be re-cooled using deep ocean water in a DOW cooler 64 (i.e. a heat exchanger) and as a recharged could then be reused in the water production system cycle with the DOW cooler effluent returned to the ocean, as shown in FIG. 12.

One vibration device (i.e. vibratory means 38) that is attached to the heat exchanging tubing maybe electrically, hydraulically or pneumatically driven to cyclically vibrate the heat exchanger tubes to reduce condensate surface, allowing the condensate of be stripped off the heat exchanger tubes more quickly and allows for further condensation to occur.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

My invention resides not in any one of these features per se, but rather in the particular combinations of some or all of them herein disclosed and claimed and it is distinguished from the prior art in these particular combinations of some or all of its structures for the functions specified.

With respect to the above description then, it is to be realized that the optimum dimensional relationships for the parts of the invention, including variations in size, materials, shape, form, function and manner of operation, assembly and use, and all equivalent relationships to those illustrated in the drawings and described in the specification, that would be deemed readily apparent and obvious to one skilled in the art, are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A water production system for efficiently making potable water in an environment of humid air comprising: at least one heat exchanger in which a cooling fluid is drawn through internally by a negative pressure siphon, said at least one heat exchanger being disposed in a path of the humid air so that the humid air flows externally on the at least one heat exchanger to condense water vapor from the humid air and produce potable water; means for controlling the volume of the cooling fluid passing through the at least one heat exchanger in response to an amount of heat absorbed by the at least one heat exchanger in the process of condensing water vapor from the humid air; and means for enhancing the rate of at which water vapor is condensed from the humid air, the means for controlling the volume of the cooling fluid passing through the at least one heat exchanger comprises: at least one inlet reservoir open to the environment for receiving the cooling fluid, said at least one inlet reservoir comprises at least one float valve for maintaining a volume of cooling water in said inlet reservoir at a predetermined inlet upper level; at least one outlet reservoir open to the environment for receiving the cooling fluid discharged from the heat exchanger, said at least one outlet reservoir comprises a controller for controlling an outlet upper level that is below the inlet upper level; and the at least one heat exchanger has a cooling fluid circuit extending from the inlet reservoir through the heat exchanger to the outlet reservoir, the inlet end of the cooling fluid circuit is disposed below the inlet upper level, and the outlet end of the cooling fluid circuit is disposed below the outlet upper level, whereby, a regulated flow of cooling fluid is siphoned through the cooling fluid circuit by a vacuum created when the controller lowers the outlet upper level in the outlet reservoir in response to the temperature of the cooling fluid at the outlet end of the water circuit, wherein the controller comprises an actuated valve, for regulating the release of cooling fluid from the outlet reservoir and adjusting the outlet upper level, operably connected that is responsive to the temperature of the cooling fluid in the outlet reservoir.

* * * * *